United States Patent
Wang

(10) Patent No.: US 11,094,125 B2
(45) Date of Patent: Aug. 17, 2021

(54) STORAGE MEDIUM, AND METHOD AND SYSTEM FOR SIMULATING PHOTOGRAPHY IN VIRTUAL REALITY SCENE

(71) Applicant: JRD Communication (Shenzhen) LTD., Shenzhen (CN)

(72) Inventor: Xiangfei Wang, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 81 days.

(21) Appl. No.: 16/492,120

(22) PCT Filed: Feb. 27, 2018

(86) PCT No.: PCT/CN2018/077331
§ 371 (c)(1),
(2) Date: Sep. 7, 2019

(87) PCT Pub. No.: WO2018/161817
PCT Pub. Date: Sep. 13, 2018

(65) Prior Publication Data
US 2021/0134060 A1    May 6, 2021

(30) Foreign Application Priority Data
Mar. 8, 2017   (CN) .......................... 201710133757.1

(51) Int. Cl.
*G06T 19/00* (2011.01)
*G02B 27/01* (2006.01)
*G06F 9/38* (2018.01)

(52) U.S. Cl.
CPC ........ *G06T 19/006* (2013.01); *G02B 27/0172* (2013.01); *G06F 9/3836* (2013.01); *G06T 19/003* (2013.01)

(58) Field of Classification Search
None
See application file for complete search history.

(56) References Cited

U.S. PATENT DOCUMENTS

| | | | |
|---|---|---|---|
| 2012/0176473 A1 | 7/2012 | Genova | |
| 2015/0371422 A1* | 12/2015 | Kokemohr | G06T 5/00 382/311 |

(Continued)

FOREIGN PATENT DOCUMENTS

| | | |
|---|---|---|
| CN | 104125407 A | 10/2014 |
| CN | 105072314 A | 11/2015 |

(Continued)

*Primary Examiner* — Frank S Chen
(74) *Attorney, Agent, or Firm* — Kirton McConkie; Evan R. Witt

(57) ABSTRACT

A storage medium, and a method and system for simulating photography in a virtual reality scene. The method comprises: firstly, in a virtual reality scene, adjusting composition parameters of a current viewport to obtain initial image data; then, adjusting camera parameters of the initial image data to obtain modified image data; and finally carrying out anti-distortion processing on the modified image data to output a target image. The demands of users for personalizing a 360-degree panoramic photo and outputting satisfying target images are satisfied. The method is not only simple to be operated, but also conducive to the further promotion and application of virtual reality technology.

17 Claims, 2 Drawing Sheets

(56) References Cited

U.S. PATENT DOCUMENTS

2017/0358141 A1* 12/2017 Stafford ................ A63F 13/537
2018/0146138 A1*  5/2018 Jeon .................. H04N 5/23238
2018/0365797 A1* 12/2018 Yu ........................ G06T 3/0018

FOREIGN PATENT DOCUMENTS

| CN | 106453913 A | 2/2017 |
| CN | 106454098 A | 2/2017 |
| CN | 107016728 A | 8/2017 |

* cited by examiner

STORAGE MEDIUM, AND METHOD AND SYSTEM FOR SIMULATING PHOTOGRAPHY IN VIRTUAL REALITY SCENE

CROSS REFERENCE

This application is a National Stage of International Application No. PCT/CN2018/077331, filed on Feb. 27, 2018, which claims priority to Chinese Application No. 201710133757.1, filed on Mar. 8, 2017. The entire disclosures of each of the above applications are incorporated herein by reference.

BACKGROUND

1. Field of the Disclosure

The present disclosure relates to the field of photography, more particularly, to a method and system for simulating photography in a virtual reality scene.

2. Description of the Related Art

Since 2016, various virtual reality devices have emerged in an endless stream and have received extensive attention. A 360-degree panoramic camera, when cooperating with a virtual reality device, can provide users with an immersive experience and a realistic feeling, so it is highly praised. The virtual reality device usually displays the left eye image and the right eye image on different parts of the mobile phone, and forms a stereoscopic effect through the cooperation of the left and right eyes.

The content captured by a 360-degree panoramic camera is usually taken with a spherical angle, that is, a 360-degree panorama, which can be viewed from various angles. However, there is no superior method to obtain an image or video corresponding to a certain angle. If the image is intercepted from a user's view angle, the image quality is not easy to be controlled although this method is relatively simple, and the formed photo is different from the camera photo. In addition, when the user obtains the content corresponding to a certain angle, the composition design cannot be performed as with the single-lens reflex camera (SLR camera), nor can the professional parameter adjustment be performed like the SLR camera. As a result, it is not possible to output a satisfactory target picture from the 360-degree panorama.

Therefore, there is a need to resolve the above problems of the related art.

SUMMARY

One objective of the present disclosure is to provide a method and system for simulating photography in a virtual reality scene to resolve the problem that the user can not perform the composition design and professional parameter adjustment on the 360-degree panoramic photo in the related art so that a satisfactory target cannot be output.

The technical solutions of the present disclosure are as follows:

In one aspect of the present disclosure, a storage medium stores program data. The program data is executable to implement the following operations: receiving a user instruction to adjust a composition parameter of a current viewport to obtain initial image data; adjusting a camera parameter of the initial image data to obtain modified image data; and performing an anti-distortion process on the modified image data to output a target picture. Adjusting the composition parameter of the current viewport comprises: tracking a direction of user's head deflection to determine a user' viewing angle and corresponding content through adjusting a head tracking parameter.

According to an embodiment of the present disclosure, the operation of receiving a user instruction to adjust a composition parameter of a current viewport to obtain initial image data comprises:
receiving, by a virtual reality device, the user instruction to determine a difference in depth of field by adjusting the focal length parameter.

According to an embodiment of the present disclosure, the composition parameter comprises a rendering parameter.

According to an embodiment of the present disclosure, the composition parameter comprises a distortion parameter.

According to an embodiment of the present disclosure, an image seen in the current viewport is one of a left eye image or a right eye side image.

According to an embodiment of the present disclosure, the camera parameter is one or more of degree of exposure, degree of saturation, size, and filter effect.

According to an embodiment of the present disclosure, performing the anti-distortion process on the modified image data to output the target picture comprises:
reading the modified image data and performing the anti-distortion process by a virtual reality device;
intercepting a frame buffer object of the current viewport and re-rendering the frame buffer object of the current viewport in a display composition system to obtain a rendered image; and
performing a screenshot process on the rendered image in the display composition system to output the target picture.

According to an embodiment of the present disclosure, the virtual reality device is a virtual reality helmet.

In another aspect of the present disclosure, a method for simulating photography in a virtual reality scene comprises:
A: adjusting a composition parameter of a current viewport in a virtual reality scene to obtain initial image data;
B: adjusting a camera parameter of the initial image data to obtain modified image data; and
C: performing an anti-distortion process on the modified image data to output a target picture.

According to an embodiment of the present disclosure, the composition parameter in step A comprises: one or more of a rendering parameter, a distortion parameter, a head tracking parameter, and a focal length parameter.

According to an embodiment of the present disclosure, adjusting the composition parameter of the current viewport comprises: tracking a direction of user's head deflection to determine a user' viewing angle and corresponding content through adjusting the head tracking parameter.

According to an embodiment of the present disclosure, adjusting the composition parameter of the current viewport comprises: a virtual reality device receiving a user instruction to determine a difference in depth of field by adjusting the focal length parameter.

According to an embodiment of the present disclosure, an image seen in the current viewport is one of a left eye image or a right eye side image.

According to an embodiment of the present disclosure, the camera parameter is one or more of degree of exposure, degree of saturation, size, and filter effect.

According to an embodiment of the present disclosure, step C comprises:
C1: reading the modified image data and performing the anti-distortion process by a virtual reality device;

C2: intercepting a frame buffer object of the current viewport and re-rendering the frame buffer object of the current viewport in a display composition system to obtain a rendered image; and C3: performing a screenshot process on the rendered image in the display composition system to output the target picture.

In still another aspect of the present disclosure, a system for simulating photography in a virtual reality scene comprises a memory and a processor coupled to the memory. The memory is configured to store an operation instruction executed by the processor and an operating system. The processor is configured to execute the processor being configured to execute the operation instruction to implement operations of:

adjusting a composition parameter of a current viewport in a virtual reality scene to obtain initial image data;

adjusting a camera parameter of the initial image data to obtain modified image data; and performing an anti-distortion process on the modified image data to output a target picture.

According to an embodiment of the present disclosure, the composition parameter comprises one or more of a rendering parameter, a distortion parameter, a head tracking parameter, and a focal length parameter.

According to an embodiment of the present disclosure, an image seen in the current viewport is one of a left eye image or a right eye side image.

According to an embodiment of the present disclosure, the camera parameter is one or more of degree of exposure, degree of saturation, size, and filter effect.

According to an embodiment of the present disclosure, the processor is further configured to execute the operation instruction to implement operations of: reading the modified image data and performing the anti-distortion; intercepting a frame buffer object of the current viewport and re-rendering the frame buffer object of the current viewport in a display composition system to obtain a rendered image; and performing a screenshot process on the rendered image in the display composition system to output the target picture.

The beneficial effects are as follows. The present disclosure provides a method and a system for simulating photography in a virtual reality scene. Simulating camera photography process in the virtual reality viewport can be performed by using software in the virtual reality scene, so the adjustments of composition parameter and camera parameter are performed on the image, and the photo in the viewport is intercepted to finally output the target image satisfactory to the user. The method is simple in operation. Simulating photography in the virtual reality is realized to satisfy the user's needs for personalizing the 360-degree panoramic photo and outputting the satisfactory target image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present disclosure proposes a method and system for simulating photography in a virtual reality scene. For clarify and specify the purpose, scheme, and effect of the present disclosure, a detailed description will be disclosed by the following disclosure in conjunction with figures. However, it is understandable by persons skilled in the art that the description of the embodiments is used for understanding the invention, rather than limiting the invention.

Figure 1:
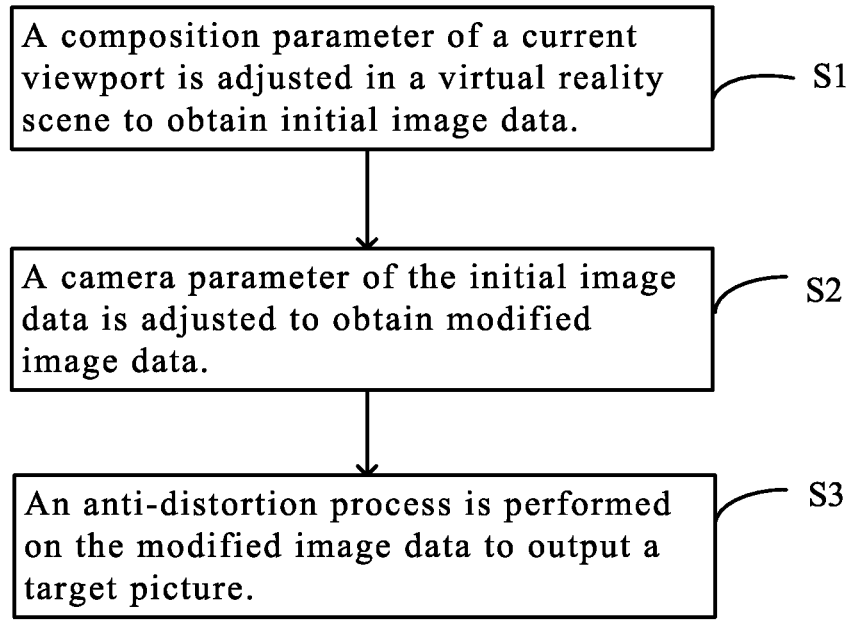
FIG. 1 is a flowchart of a method for simulating photography in a virtual reality scene according to an embodiment of the present disclosure.

A description is provided with reference to FIG. 1. FIG. 1 is a flowchart of a method for simulating photography in a virtual reality scene according to a preferred embodiment of the present disclosure. The method comprises:

S1: A composition parameter of a current viewport is adjusted in a virtual reality scene to obtain initial image data.

S2: A camera parameter of the initial image data is adjusted to obtain modified image data.

S3: An anti-distortion process is performed on the modified image data to output a target picture.

The method for simulating photography in the virtual reality scene according to the present disclosure can facilitate the user to perform the composition design and parameter adjustment like a SLR camera on the 360-degree panoramic photo through a virtual reality device, and output a target image satisfactory to the user. Not only is the operation simple, but it is also advantageous for further promotion and application of virtual reality technology.

In step S1, after the user wears the virtual reality device, a 360-degree panoramic photo is opened on a smart terminal. When viewing the 360-degree panoramic photo through the virtual reality device, the virtual reality device receives a user instruction and adjusts a composition parameter of an image that is seen in real time through the current viewport. The composition parameter comprises one or more of a rendering parameter, a distortion parameter, a head tracking parameter, and a focal length parameter. For example, the virtual reality device tracks a direction of user's head deflection to determine a user' viewing angle and corresponding content through adjusting the head tracking parameter. The virtual reality device receives the user instruction to determine a difference in depth of field by adjusting the focal length parameter. In summary, the user obtains a satisfactory composition effect by adjusting the composition parameters, and the virtual reality device stores adjusted composition parameters to obtain the initial image data.

In greater detail, the image seen in the current viewport is one of a left eye image or a right eye side image. The viewport may be a default viewport of the virtual reality device, or may be selected by the user according to his own viewing habits. Preferably, the user can switch the viewport at any time during the process of viewing the image for the best result.

Furthermore, the virtual reality device may be different types of virtual reality devices, such as a virtual reality helmet. The 360-degree panoramic photo may be a 360-degree panoramic photo downloaded online, or a 360-degree panoramic photo captured by the user himself. Since the working principle of the virtual reality device and the formation method of the 360-degree panoramic photo are within the scope of the related art, a description in this regard is not provided.

In order to completely simulate the effect of the SLR camera, the camera parameter may be adjusted after adjusting the composition parameters. In step S2, the virtual reality device adjusts the camera parameter of the initial image data to make the obtained image more beautiful. The camera parameter comprises one or more of degree of exposure, degree of saturation, size, and filter effect. That is, the user can modify the image in the viewport by means of retouching, thus enhancing the artistic effect of the photo and making the picture more in line with his aesthetic requirements.

At the same time, the virtual reality device stores the adjusted camera parameters to obtain the modified image data.

The photo captured by a 360-degree panoramic camera is taken by using a fisheye lens, and the image itself is distorted. It is thus necessary to process the image before an image of content corresponding to a certain angle of the 360-degree panoramic photo can be displayed as the target picture. Therefore, it is necessary to perform the anti-distortion process on the modified image data in step S3 so as to output the target picture.

Figure 2:
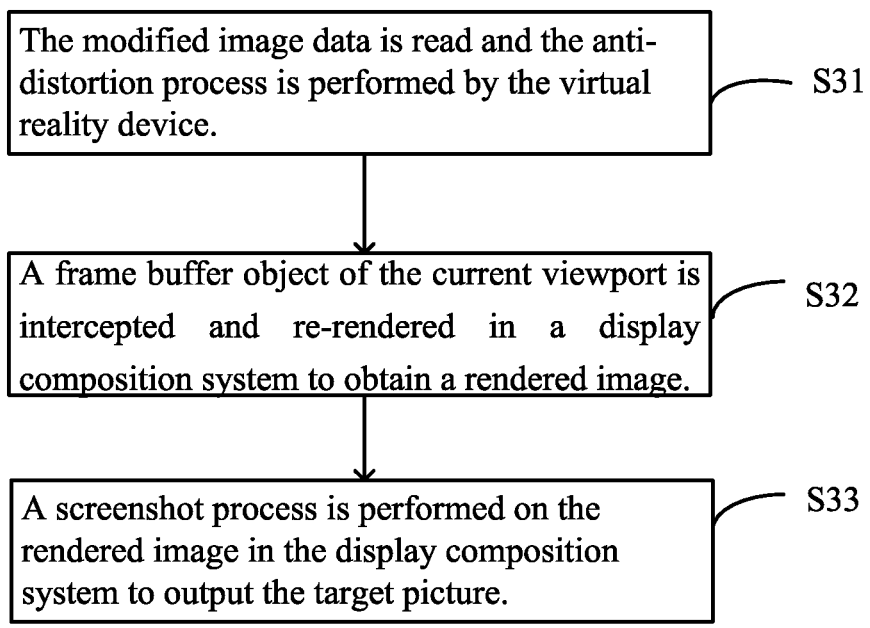
FIG. 2 is a detailed flowchart of step S3 of the method in FIG. 1.

A description is provided with reference to FIG. 2. FIG. 2 is a detailed flowchart of step S3 of the method in FIG. 1. Step S3 comprises:

S31: The modified image data is read and the anti-distortion process is performed by the virtual reality device.

S32: A frame buffer object of the current viewport is intercepted and re-rendered in a display composition system to obtain a rendered image.

S33: A screenshot process is performed on the rendered image in the display composition system to output the target picture.

In step S31, the virtual reality device reads the modified image data and performs the anti-distortion process. Since the image captured by the 360-degree panoramic camera is distorted, the anti-distortion process needs to be performed before the image is selected and formed according to a corresponding angle so as to restore the distorted image. As a result, a planar photo is formed. This anti-distortion process is related to the shooting algorithm of the 360-degree panoramic camera, and is an image process technology in the related art.

In step S32, the frame buffer object of the current viewport is intercepted and re-rendered in the display composition system to obtain the rendered image. In step S33, the screenshot process is performed on the rendered image in the display composition system to output the target picture. The regular photo is a planar photo captured by a smart terminal or the like, such as a JPEG format photo.

On the basis of the above method of the present disclosure, the formed picture can be continuously played to form a video, especially a partial short film, which can be achieved by processing each frame of the photos.

Based on the method for simulating photography in the virtual reality scene according to the above embodiment, the present disclosure further discloses a system for simulating photography in a virtual reality scene. The system comprises a memory and a processor. The memory is configured to store an operation instruction executed by the processor and an operating system. The processor is configured to execute the method for simulating photography in the virtual reality scene of the above embodiment according to the operation instruction stored in the memory. In greater detail, the actions performed by the processor in the system for simulating photography in the virtual reality scene according to the present disclosure correspond to the functions of various modules and/or units shown in FIG. 3.

One of ordinary skill in the art would understand that all or part of the processes in the above embodiments may be completed by related hardware instructed by a computer (or a mobile terminal) program, and the computer (or the mobile terminal) program may be stored in a computer (or a mobile terminal) readable storage medium. The program, when being executed, may comprise the process of the method of each of the above embodiments. The storage medium may be a magnetic disk, an optical disc, a Read-only memory (ROM), or a Random access memory (RAM), etc.

Figure 3:
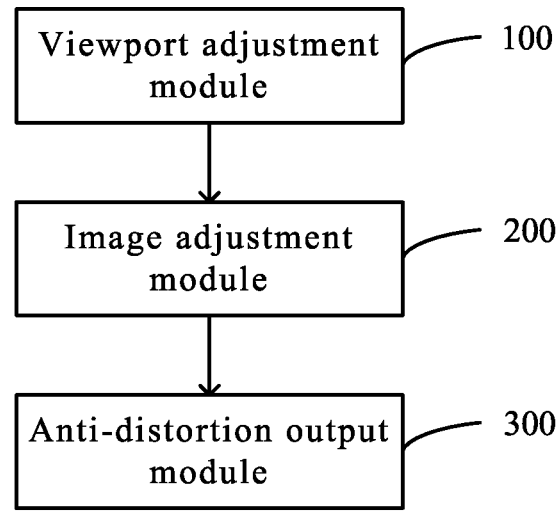
FIG. 3 is a structural block diagram of a system for simulating photography in a virtual reality scene according to a preferred embodiment of the present disclosure.
Figure 4:
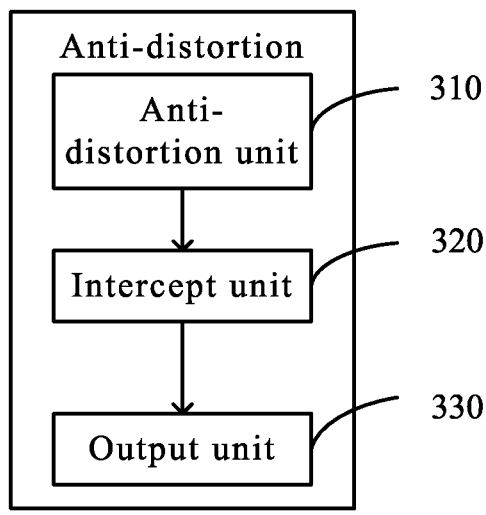
FIG. 4 is a detailed structural block diagram of the anti-distortion output module of the system in FIG. 3.

FIG. 3 is a structural block diagram of a system for simulating photography in a virtual reality scene according to a preferred embodiment of the present disclosure.

The system comprises:

A viewport adjustment module 100 configured to adjust a composition parameter of a current viewport in the virtual reality scene to obtain initial image data; An image adjustment module 200 configured to adjust a camera parameter of the initial image data to obtain modified image data; and An anti-distortion output module 300 configured to perform an anti-distortion process on the modified image data to output a target picture.

The composition parameter of the viewport adjustment module 100 comprises one or more of a rendering parameter, a distortion parameter, a head tracking parameter, and a focal length parameter.

An image seen in the current viewport is one of a left eye image or a right eye side image.

The camera parameter comprises one or more of degree of exposure, degree of saturation, size, and filter effect.

The anti-distortion output module 300 comprises:

An anti-distortion unit 310 configured to allow a virtual reality device to read the modified image data and perform the anti-distortion process;

An intercept unit 320 configured to intercept a frame buffer object of the current viewport, and re-render the frame buffer object of the current viewport in a display composition system to obtain a rendered image; and an output unit 330 configured to perform a screenshot process on the rendered image in the display composition system to output the target picture.

In summary, the present disclosure provides a method and a system for simulating photography in a virtual reality scene. Through performing processes by using the software in the system for simulating photography in a virtual reality scene, the camera photography process can be simulated in the virtual reality viewport. The adjustments of composition parameter and camera parameter are performed on the image, and the photo in the viewport is intercepted to finally output the target image satisfactory to the user. Simulating photography in the virtual reality is realized to satisfy the user's needs for personalizing the 360-degree panoramic photo and outputting the satisfactory target image.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A non-transitory storage medium storing program data, the program data being executable to implement operations of:
   receiving a user instruction to adjust a composition parameter of a current viewport to obtain initial image data;
   adjusting a camera parameter of the initial image data to obtain modified image data;
   reading the modified image data and performing an anti-distortion process;
   intercepting a frame buffer object of the current viewport and re-rendering the frame buffer object of the current viewport to obtain a rendered image; and
   performing a screenshot process on the rendered image to output a target picture;
   wherein adjusting the composition parameter of the current viewport comprises: tracking a direction of user's head deflection to determine a user' viewing angle and corresponding content through adjusting a head tracking parameter.

2. The non-transitory storage medium as claimed in claim 1, wherein the operation of receiving a user instruction to adjust a composition parameter of a current viewport to obtain initial image data comprises:
   receiving the user instruction to determine a difference in depth of field by adjusting the focal length parameter.

3. The non-transitory storage medium as claimed in claim 1, wherein the composition parameter comprises a rendering parameter.

4. The non-transitory storage medium as claimed in claim 1, wherein the composition parameter comprises a distortion parameter.

5. The non-transitory storage medium as claimed in claim 1, wherein an image seen in the current viewport is one of a left eye image or a right eye side image.

6. The non-transitory storage medium as claimed in claim 1, wherein the camera parameter is one or more of degree of exposure, degree of saturation, size, and filter effect.

7. The non-transitory storage medium as claimed in claim 1, wherein the virtual reality device is a virtual reality helmet.

8. A method for simulating photography in a virtual reality scene comprising:
   A: adjusting a composition parameter of a current viewport in a virtual reality scene to obtain initial image data;
   B: adjusting a camera parameter of the initial image data to obtain modified image data;
   C1: reading the modified image data and performing an anti-distortion process by a virtual reality device;
   C2: intercepting a frame buffer object of the current viewport and re-rendering the frame buffer object of the current viewport in a display composition system to obtain a rendered image; and
   C3: performing a screenshot process on the rendered image in the display composition system to output a target picture.

9. The method as claimed in claim 8, wherein the composition parameter in step A comprises:
   one or more of a rendering parameter, a distortion parameter, a head tracking parameter, and a focal length parameter.

10. The method as claimed in claim 9, wherein adjusting the composition parameter of the current viewport comprises:
    tracking a direction of user's head deflection to determine a user' viewing angle and corresponding content through adjusting the head tracking parameter.

11. The method as claimed in claim 9, wherein adjusting the composition parameter of the current viewport comprises:
    receiving, by a virtual reality device, a user instruction to determine a difference in depth of field by adjusting the focal length parameter.

12. The method as claimed in claim 8, wherein an image seen in the current viewport is one of a left eye image or a right eye side image.

13. The method as claimed in claim 8, wherein the camera parameter is one or more of degree of exposure, degree of saturation, size, and filter effect.

14. A system for simulating photography in a virtual reality scene comprising a memory and a processor coupled to the memory:
    the memory being configured to store an operation instruction executed by the processor and an operating system;
    the processor being configured to execute the operation instruction to implement operations of:
    adjusting a composition parameter of a current viewport in a virtual reality scene to obtain initial image data;
    adjusting a camera parameter of the initial image data to obtain modified image data;
    reading the modified image data and performing an anti-distortion process;
    intercepting a frame buffer object of the current viewport and re-rendering the frame buffer object of the current viewport in a display composition system to obtain a rendered image; and
    performing a screenshot process on the rendered image in the display composition system to output a target picture.

15. The system as claimed in claim 14, wherein the composition parameter comprises:
    one or more of a rendering parameter, a distortion parameter, a head tracking parameter, and a focal length parameter.

16. The system as claimed in claim 14, wherein an image seen in the current viewport is one of a left eye image or a right eye side image.

17. The system as claimed in claim 14, wherein the camera parameter is one or more of degree of exposure, degree of saturation, size, and filter effect.

* * * * *